United States Patent [19]

Berdat et al.

[11] 4,435,055
[45] Mar. 6, 1984

[54] MULTIPLE FREQUENCY RANGING APPARATUS FOR FOCUS CONTROL

[75] Inventors: Henry F. Berdat, Manchester; Kerry D. Baines, Vernon, both of Conn.

[73] Assignee: The Gerber Scientific Instrument Company, South Windsor, Conn.

[21] Appl. No.: 292,220

[22] Filed: Aug. 12, 1981

[51] Int. Cl.³ .............................................. G03B 13/20
[52] U.S. Cl. ..................................... 354/4; 354/195.1; 346/108; 367/96
[58] Field of Search ..................... 354/4, 195; 346/108; 367/95, 96, 97; 353/101; 355/56

[56] References Cited

U.S. PATENT DOCUMENTS 3,650,615  3/1972  Aoki et al. .............................. 367/96
4,199,246  4/1980  Muggli ................................. 354/195

FOREIGN PATENT DOCUMENTS

56-27116  3/1981  Japan .................................. 354/195

*Primary Examiner*—Russell E. Adams
*Attorney, Agent, or Firm*—McCormick, Paulding & Huber

[57] ABSTRACT

A photoplotter includes an autofocus control for maintaining a precise focal distance between a photohead in the plotter and the film surface which is exposed by the head. The autofocus control employs a dual frequency ultrasonic ranging apparatus which permits coarse focus control at one frequency and fine focus control at a second, higher frequency.

25 Claims, 5 Drawing Figures

MULTIPLE FREQUENCY RANGING APPARATUS FOR FOCUS CONTROL

BACKGROUND OF THE INVENTION

The present invention relates to an apparatus for measuring distances and, is concerned more particularly with ranging apparatus for controlling the focus of an optical instrument.

It is well known in the art to employ ultrasonic ranging equipment for measuring focal distance. U.S. Pat. Nos. 4,199,246, 4,148,574 and 4,167,316 all disclose sonic ranging systems for determining and setting the focus of cameras.

In the camera field, focus control is necessitated in order to bring the object being photographed into the field of view of the camera lens system. In such instances, the depth of view field, that is the portion of the field which is in focus, may be relatively large, and for this reason, precise control over the focal adjustment is not critical. In certain types of instruments such as photoplotters or laser cutters, the depth of field is limited. This condition of limited field is common with optical systems that focus on objects in close proximity to the lens systems. With high accuracy photoplotters that are used to generate "masters" for printed circuitboards, the photoplate or film being exposed is held very close to the photohead for several reasons, and a depth of field in the range of 0.01 inch is not uncommon. Consequently, the problem of maintaining a properly focused image is acute. Sharp focusing is essential in order to clearly delineate the conductive and nonconductive portions of the circuitboard. Additionally, microcircuits are becoming increasingly more important, and such circuits employ extremely fine conductors in high density arrays. Focus control in the production of such circuits takes on even greater significance.

It is known that glass film plates from which masters are manufactured have surface irregularities. A 20"×24" sheet of ultra flat film has surface errors, referred to as diagonal curvature, in the order of 0.0019 inch. The overall flatness of a 20"×24" plate may vary by as much as 0.0112 inch across the photosensitive surface. With high precision photoplotters, these variations in the surface of the glass have a significant impact on the focus of any image projected onto the photosensitive surface in view of the limited depth of field.

Additional factors unrelated to the film plate itself and which also effect focus are found in the structure which supports the plate and produces relative movement between the plate and the optical head. For example, a lack of parallelism between the ways on which the head and plate are moved relative to one another causes the distance between the head and photosensitive surface to vary at different locations on the plate. Also, irregularities in the surface of the ways or on the guides which travel on the ways superimpose additional positioning errors on any lack of parallelism.

For this reason, some prior art photoplotters have been provided with control mechanism to adjust the optical head of the plotter and thereby maintain a substantially uniform distance between the photohead and the photosensitive surface being exposed by the head. U.S. Pat. No. 3,511,149 to Blattner and U.S. Pat. No. 3,704,657 to Sliwkowski are two examples of photoplotters having devices for adjusting the optical head relative to the photographic surface for focus control. In each of these prior art plotters, a pneumatic sensor mounted adjacent the optical axis of the head detects the distance between the head and the photosensitive surface of a film and makes appropriate adjustments in the positioning of the head relative to the surface to hold the focus of the head.

For the reasons mentioned above and the requirements for more accurate control of focus on the film plane, it is a general object of the present invention to provide a ranging apparatus that permits precise automatic focus control in a photoplotter or other optical instrument.

SUMMARY OF THE INVENTION

The present invention resides in a multtiple frequency ranging apparatus for measuring the distance between an object such as the optical head in a photoplotter and a reference plane such as the film surface on which a focused image is desired.

The apparatus includes wave generating means for producing discrete energy waves at characteristic first and second frequencies, the second frequency being higher than the first frequency. The generating means transmits the waves between the object and the reference plane, and the receiving means is associated with the transmitting means to receive the transmitted waves at both frequencies. Detecting means are connected with the receiving means for detecting the phase difference and determining the distance between the object and the reference plane at both the first frequency and the second frequency. Switching means associated with the detecting means controls the detection process at the first frequency for coarse detection of the distance and at the second frequency for fine detection.

In a photoplotter or other optical device, the detected distance between the object and the reference plane is employed to adjust the focus of the optical head on a film. Motor means are provided in the device for adjusting the positioning of the lens system relative to the photosensitive surface of a film, and the distance measured by the detecting means is utilized to actuate the motor means for focus adjustment.

With a dual or multiple frequency ranging apparatus providing both coarse and fine focus adjustments, the management of focus on the film is improved significantly. Plotting operations can be carried out on film plates without significant concern about flatness or diagonal curvature. Also, deviations in focus caused by the optical device itself or the manner in which the film plate is mounted in the device are accommodated without difficulty. Overall, the resulting product exposed on the film plate has an improved quality.

DESCRIPTION OF THE PREFERRED EMBODIMENTS

Figure 1:
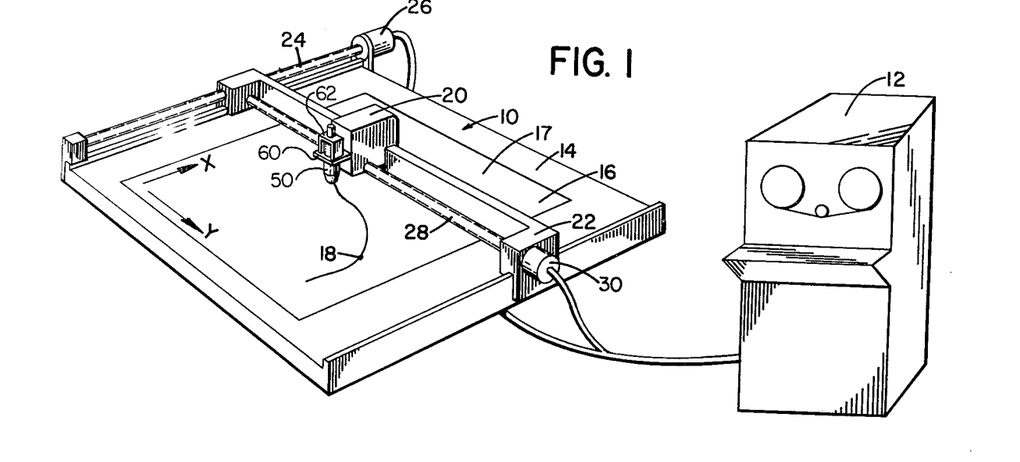
FIG. 1 is a perspective view of a photoplotter embodying the ranging apparatus of the present invention.

FIG. 1 illustrates a photoplotter generally designated 10 in which the autofocus control of the present invention is embodied. The photoplotter 10 operates in response to an automatic controller 12 that is located remotely from the plotter and provides plotting commands in accordance with a preestablished program. The photoplotter includes a support table 14 on which a film plate 16 is positioned with a photosensitive surface 17 or film plane facing upwardly toward an optical head 20. The optical head exposes plots on the photosensitive surface by projecting a beam of light downwardly onto a spot on the surface and by moving generally parallel to the surface in the illustrated X- and Y-coordinate directions to expose line traces 18. The plot or artwork generated by the head 20 may represent the master of a printed circuitboard or other product.

The optical head 20 is mounted on a carriage 22 spanning the table 14, and the carriage is controllably translated back and forth over the table in the X-coordinate direction by means of a lead screw 24 and a drive motor 26 in response to commands received from the automatic controller 12. The optical head also moves on the carriage 22 relative to the table 14 in the illustrated Y-direction by means of another lead screw 28 and a drive motor 30 operated in response to commands from the controller 12. Through composite motions in the X- and Y-directions, the optical head can move parallel to the film plate 16 and produce line traces at any location on the photosensitive surface 17.

Figure 2:
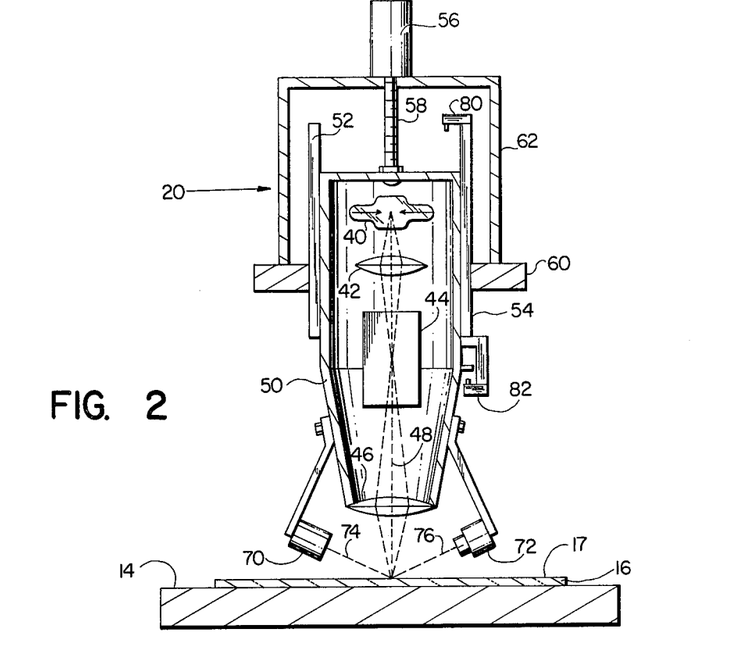
FIG. 2 is an elevation view of the optical head in the photoplotter of FIG. 1 and the support for the film plate exposed by the head.

FIG. 2 illustrates the optical head 20 in greater detail and the portions of the head which project images downwardly onto the photosensitive surface 17 of the film 16. The head includes a light source 40, such a flashed xenon lamp, which generates a beam of light that is projected through a columnating lens 42 and other optical devices 44 to produce an image that is to be exposed on the film 16. An objective lens 46 in the lower portion of the optical head is employed to project the image from the devices 44 along an optical axis 48 of the head onto the photosensitive surface 17 in a focused condition so that an accurate and sharp reproduction of the image is exposed in the film 16. For a more detailed description of the optical head and its operation, reference is made to U.S. Pat. No. 3,848,520 having the same assignee as the present invention.

All of the optical equipment in the head 20 is mounted fixedly within a housing 50 and the housing is adjustably mounted in a set of ways 52, 54 for movement toward and away from the plotting table 14 and the film plate 16. Movement of the housing 50 along the optical axis 48 adjusts the position of the focal plane of the head and is produced by means a servomotor 56 which has a lead screw 58 fixedly attached to the upper portion of the housing 50. The servomotor 56 is mounted in stationary relationship on a bridge structure 62 above a carriage platform 60. The optical head 20 and the platform 60 are translated parallel to the plotting table 14 by means of the carriage 22 and associated lead screws and drive motors illustrated in FIG. 1. Thus, as the optical head 20 is translated over the film plate 16 in a plotting operation, the focal plane of the head or the focal point of the objective lens 46 can be adjusted relative to the photosensitive surface 17 by means of the servomotor 56. Adjustment of the focus by means of the servomotor 56 is performed by the autofocus control of the present invention described below.

The autofocus control of the present invention employs a multifrequency ranging apparatus for measuring and adjusting the distance between the objective lens 46 of the optical head 20 and the photosensitive surface of 17 of the film plate 16. In a preferred embodiment of the invention, a dual range ultrasonic generator transmits energy waves of two different frequencies between the optical head and the film surface to measure the intervening distance. The lower of the two frequencies provides a coarse measure of distance to preliminarily establish an approximate separating distance between the film and optical head and corresponding focus, and the higher frequency provides a fine measure of the distance to accurately maintain the distance thereafter.

For example, the autofocus control produces a characteristic low frequency to bring the objective lens 46 into approximate focus on the photosensitive surface 17 when a plotting operation is initiated. Since the film plate 16 may have a number of different thicknesses and may be set in a film chase at various heights on the plotting table 14, the coarse adjustment of the optical head must accommodate a fairly wide range of film plane positions. In one embodiment of the invention, the coarse mode of adjustment at 10 kHz covers a band of approximately ±0.2 inch (5.1 mm) and provides a resolution within that range of ±0.001 inch (0.025 mm). After the coarse adjustment is made, the autofocus control switches to a higher characteristic frequency to maintain the focus more precisely due to ripples and other smaller variations in the photosensitive surface 17. The more precise or fine mode of adjustment is made at 210 kHz and covers a band of ±0.008 inch (0.2 mm) with a resolution of 0.0001 inch (0.0025 mm).

Figure 3:
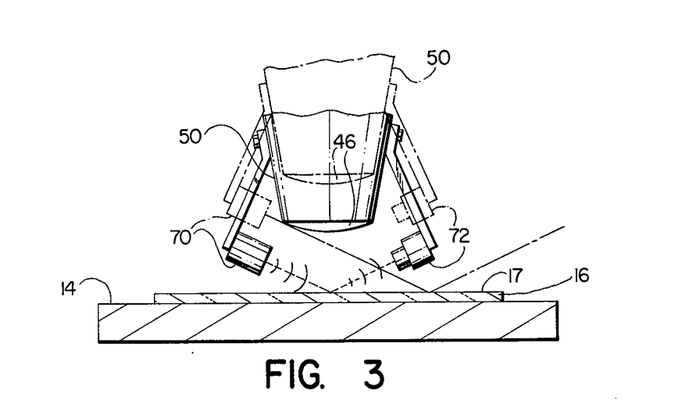
FIG. 3 is a fragmentary view of the photohead illustrating the operation of the ranging apparatus at various elevations of the head.

The principal components of the autofocus system shown in FIGS. 2 and 3 are the wave transmitter 70 and a receiver 72. The transmitter and receiver are mounted in spaced relationship with each other on the housing 50 of the optical head. Preferably, the transmitter is an ultrasonic transducer with directional characteristics to direct an ultrasonic engery wave along an axis 74 toward the photosensitive surface 17. The receiver 72 in such case is an ultrasonic transducer also having directional characteristics and receives energy waves reflected from the surface 17 along an axis 76. Both the transmitter and the receiver are primarily operative along their respective axes but produce measurable outputs within a limited range off axis. The transducer 70 and receiver 72 are mounted on opposite sides of the optical axis 48 and are oriented so that their respective axes 74, 76 lie in a common plane and at the same angle relative to the photosensitive surface 17, and intersect the optical axis at the focal point of the objective lens 46. With this geometry, the energy wave emitted by the transmitter 70 is reflected from the photosensitive surface 17, but is only received by the receiver 72 when the optical head 20 is in the correct focus position or at positions immediately above and below the focus position.

The photohead 20 in one embodiment of the autofocus control is initially brought into the focused position shown in FIG. 2 by elevating the housing 50 with the servomotor 56 until a limit switch 80 at the upper end of the way 54 is contacted. At that point the servomotor 56 is reversed and drives the housing 50 downwardly until a perceptible signal is detected from the ultrasonic receiver 72. In the event that a signal is not detected at the proper adjustment, a lower limit switch 82 will be contacted and shut off the servomotor 56.

FIG. 3 illustrates the initializing procedure with the housing 50 at two different elevated positions. At the upper position shown in phantom, the transmitter 70 emits an ultrasonic wave that strikes and is reflected from the photosensitive surface 17 at a position that renders the receiver 72 incapable of detecting the reflected portion of the wave. In the lower position, the housing 50 is coarsely adjusted at the proper focal distance, and the receiver 72 is in alignment with, and accordingly, receives the reflected wave. By appropriate selection of the coarse ranging frequency and the positioning of the ultrasonic transmitter and receiver 70, 72, the receiver will not produce a measurable output until the housing 50 approaches the film surface 17 within the dimensional band of adjustment about the focused position. In other words, the autofocus control will not produce a perceptible signal from the receiver 72 until the objective lens is approximately in the correct position for focusing images on the film surface 17.

At this point, the initializing procedure is finished and the ranging apparatus including the transmitter 70 and receiver 72 takes over responsibility for driving the servomotor 56 and maintaining the optical head 20 in a focused condition relative to the film plate 16.

Figure 5:
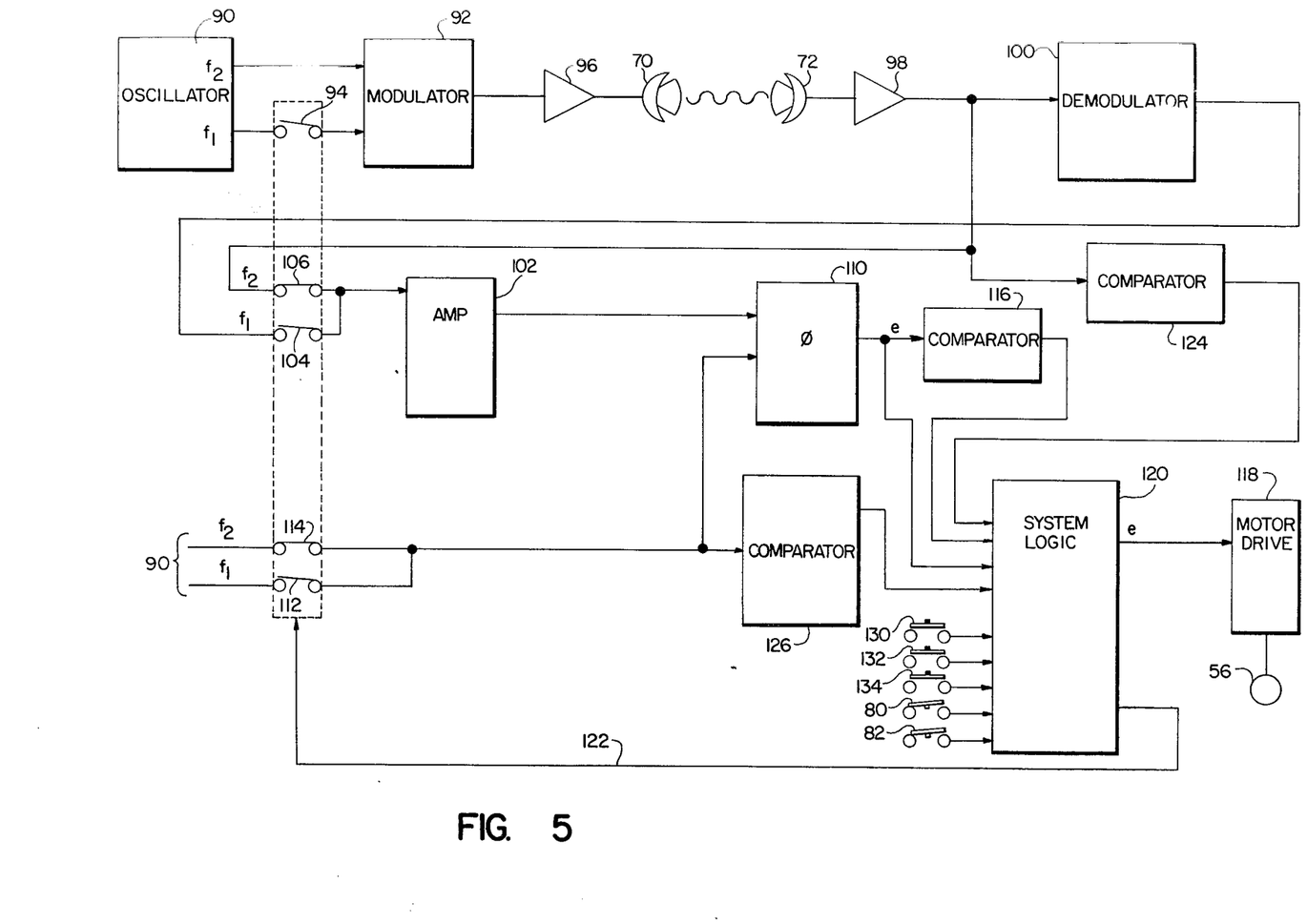
FIG. 5 is a block diagram of the autofocus control in one embodiment for the photoplotter of FIGS. 1–3.

FIG. 5 illustrates one embodiment of the autofocus control in detail. This embodiment includes a dual frequency ultrasonic ranging apparatus that utilizes one frequency for establishing a coarse focus adjustment and a second higher frequency for fine focus adjustment.

The wave generating means for the control includes a dual frequency oscillator 90 that produces two characteristic ranging frequencies, a lower frequency f1 and a higher frequency f2. The lower frequency is applied to a frequency modulator 92 through an electronic mode switch 94 shown schematically, while the second higher frequency is applied directly to the modulator at all times. When the mode switch 94 is closed for coarse focus adjustment, the higher frequency f2 is amplitude modulated by the modulator 92 at the characteristic low frequency f1 and drives the amplifier 96 and the ultrasonic transmitter 70. Hence, the ultrasonic wave generated in the coarse mode of operation is a modulated carrier wave at the frequency f2 but the characteristic frequency of the wave is defined by the amplitude modulations at the frequency f1.

In the fine mode of operation for maintaining precise focusing of the optical head, the mode switch 94 is open and the modulator causes the transmitter 70 to produce an unmodulated wave having the characteristic frequency f2. The use of the same frequency for the carrier in the coarse mode and the characteristic frequency in the fine mode allows the hardware to be selected for maximum response and avoids lower frequencies in the audio range.

The receiver 72 accepts both the modulated and unmodulated waves at the carrier frequency f2 and produces corresponding signals which are relayed through the amplifier 98 to a demodulator 100 and an amplifier and clipper 102. In the coarse mode of adjustment when the ultrasonic wave is modulated, the demodulator 100 detects the amplitude modulations at the frequency f1 and provides a corresponding output to the amplifier 102 through a solid state mode switch 104 shown schematically. During the coarse mode, the mode switch 106 is open so that the amplifier 102 receives only one input at the characteristic frequency f1.

In the fine mode of operation, the mode switch 104 is open and the mode switch 106 is closed as shown so that the amplifier 102 receives a signal at the characteristic frequency f2.

The discrete signals at one of the two characteristic frequencies are applied to a phase detector 110 where the phase difference attributable to the distance traveled along the reflected path between the transmitter 70 and receiver 72 is determined through a phase comparison of the reflected wave from the receiver 72 with the corresponding reference wave derived from the oscillator 90 through the appropriate mode switch 112 or 114. The detected phase is compared by the detector 110 with a predetermined phase that exists at the correct focal distance, and any departure from the predetermined phase appears at the output of the detector and constitutes a focus error signal e that actuates the motor drive circuitry 118 for the servomotor 56 through the system logic circuitry 120. The servomotor is actuated by the error signal and moves the optical head in the appropriate direction toward or away from the film plane to obtain the correct focal distance.

The error signal e is also examined in an error supervision comparator 116 to determine if the signal is within a preset tolerance. The comparator 116 is basically a level detector and produces an enabling signal to the system logic 120 whenever the error signal is within tolerance. If the signal is out of tolerance due possibly to failure of a component in the transmitting, receiving or detecting circuitry, then the comparator inhibits operation of the system logic circuitry 120 or decouples the servomotor 56, and the servomotor remains locked at the last adjustment position. A failure warning light (not shown) may be actuated simultaneously.

The error signal e is also employed in the system logic circuitry 120 to control the switching of the autofocus control, and more particularly, the mode switches 94, 104, 106, 112 and 114 between the coarse and fine modes of operation. Initially, the circuitry 120 operates in the coarse mode as the optical head is moved through the initialization phase of operation described in connection with FIG. 3. When the error signal e, received by the logic circuitry 120, falls below a predetermined level, it indicates that the optical head is approaching the correct focal distance from the film plane. At that point in time, the logic circuitry actuates the mode switches, which are preferably solid state FET switches, through the conductor 122, and the focus control switches into the fine mode of operation.

The switching of the mode of operation from a low frequency to a higher frequency allows the autofocus control to maintain the focused condition with greater resolution. In other words, the focus control operated at the higher frequency is capable of tracking small variations in the focal distance between the objective lens and the film surface with greater precisions. The ability to correct for such small variations in the focal distance with the dual frequency control is explained in greater detail in connection with the illustration of two characteristic ranging frequencies in FIG. 4.

Figure 4:
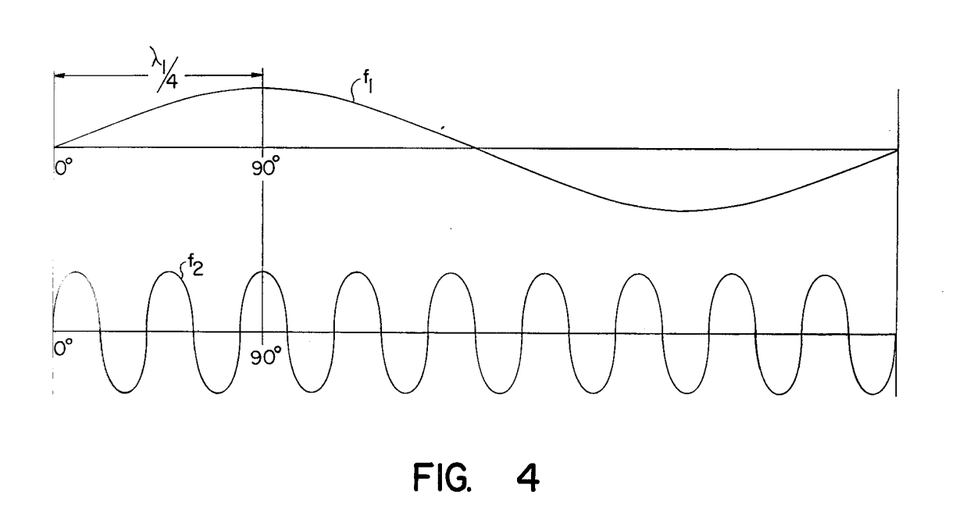
FIG. 4 is a diagram illustrating ultrasonic waves at different characteristic frequencies for coarse and fine control of focus.

FIG. 4 illustrates by way of an example two ultrasonic frequencies that can be employed in the autofocus control illustrated in FIG. 5. It will be observed that the higher frequency f2 is nine times larger than the frequency f1. Thus, for example, the frequency f1 may be 10 kHz and the frequency f2 would be 90 kHz.

In order for the autofocus control to initially move the optical head from an elevated position into an approximately correct focused position at the lower frequency f1, the wavelength of the frequency f1 is selected so that the receiver 72 in FIGS. 2 and 3 does not detect and produce a measurable signal reflected from the film surface 17 until the receiver is well within one wavelength of the focused position along the reflected wave path. In other words, when the receiver 72 begins to detect the transmitted ultrasonic wave reflected from the film surface 17, the receiver will be in approximately the correct focal position above the film surface 17, and the distance between the transmitter and receiver will be the correct number of wavelengths along the reflected wave path between the transmitter and receiver.

For the sake of illustration, it will be assumed that the distance between the transmitter and receiver at the correct focal distance is approximately ¼ of a wavelength at the frequency f1, and therefore the difference in phase between the wave emitted by the transmitter and received by the receiver will be 90 degrees. Hence, the detector 110 in FIG. 5 is adjusted or preset to produce a null signal when the phase measured by the detector is 90 degrees. The distance along the reflected wave path is therefore ¼ of a wavelength as illustrated schematically in FIG. 4.

The system logic circuitry 120 includes a null detection circuit that recognizes the condition in which the error signal e from the comparator is at or substantially at a null condition. The circuitry then produces a mode switching signal on the conductor 122 connecting with the series of mode switches 94, 104, 106, 112 and 114 and changes the operating frequency of the focus control from the lower frequency f1 to the higher frequency f2.

After the frequency change occurs, the phase detector 110 comprises the transmitted and received signals at the second, higher frequency f2. FIG. 4 illustrates that if the autofocus control obtains the correct focus at ¼ wavelength of the lower frequency f1, then the correct focal distance measured along the reflected wave path will be several wavelengths at the higher frequency f2. Since the phase detector 110 merely detects the difference in phase between the transmitted wave and the received wave, the fact that the reflected wave path is several wavelengths long is inconsequential, and the autofocus system will operate about a null condition at the 90 degree phase point several cycles or wavelengths along the reflected path.

Small variations due to waviness or slope of the film surface relative to the plane in which the optical head is moved are detected with far greater accuracy due to the greater variation of the error signal e at the higher frequency. A constant repositioning of the optical head through the drive motor circuitry 118 and the servomotor 56 holds the optical head at the correct focal position as the servo system maintains the 90 degree phase difference and associated optical distance between the objective lens 46 and the film surface 17.

It will be observed that the focal distance maintained by the autofocus control is the distance along the focal axis between the objective lens and the film surface because the axes of the transmitter 70 and receiver 72 are oriented toward and intersect the focal point of the objective lens at the film surface. Thus, the autofocus control actually focuses on the position of the objective rather than some offset reference point assumed to be in the same plane as the film surface.

It will be understood that when the same phase detector is employed to determine the phase difference for two characteristic frequencies, the correct focal distance does not always equate to the same phase difference as in the case illustrated with the frequencies of FIG. 4. It can be shown, for example, that the 90 degree phase relationship prevails at both frequencies only where the ratio of the frequencies equals $4n+1$, n being a positive integer. As a consequence, a large step change in the error signal e may occur when the frequencies are switched. While such an error signal may be tolerated by the servomechanism, it is desirable that the two frequencies be correlated sufficiently to bring the optical head substantially into the proper focal position at approximately the same phase angle when one phase detector is employed. Otherwise, different phase detectors may be provided with appropriate adjustments for the two different frequencies respectively. The 90 degree phasing described above is particularly advantageous since it can be readily detected with digital circuitry. Calibration of the autofocus control at the 90 degree phase with appropriately matched frequencies can be obtained by adjustment of the transmitter 70 and receiver 72 along their respective axes.

The autofocus control illustrated in FIG. 5 also includes signal supervision comparators 124 and 126. The comparators are basically level detectors similar to the comparator 116 and are connected in controlling relationship with the system logic circuit. If the signal from the receiver 72 falls below a predetermined level, the comparator 124 advises the system logic circuitry 120 and inhibits the error signal e from exercising any further control over the servomotor 56. Thus, if the focus control signal is lost, the optical head will remain locked at the last focus controlled position. The comparator 126 monitors the level of the reference signal and inhibits the error signal in the same manner as the comparator 124.

The limit switches 80, 82 on the optical head 20 in FIG. 2 are connected to the system logic circuitry as shown in FIG. 5 and inhibit operation of the drive motor circuitry 118 and servomotor 56 when the optical head reaches either the upper or the lower limit. Other switches controlling the operation of the servomotor 56 include a manually actuated "unload" switch 130 for elevating the optical head after a plotting operation to allow the film plate 16 to be removed from the plotting table 14, a "load" switch 132 to start the optical head moving from an elevated position downwardly during the initialization phase of operation, and a stop switch 134 to terminate all operations of the autofocus control.

Accordingly, a multi-frequency autofocus control has been disclosed in a photoplotter for accurately maintaining a focused condition with high resolution. A low frequency is employed for coarse focus adjustment and a higher frequency for fine adjustment. Due to the positioning of the transducers, the control maintains focus along the optical axis of the plotter rather than at a remote reference point.

While the present invention has been described in a preferred embodiment, it should be understood that numerous modifications and substitutions can be had. For example, it is contemplated within the scope of the invention that more than two frequencies may be employed to obtain coarse, intermediate and fine levels of control. The autofocus control may also switch back and forth between high and low frequencies as the error signal driving the servomotor dictates. Although the servomotor 56 moves the entire optical head 20 relative to the film surface 17, it is also anticipated that the lens system itself may be adjusted by the servomotor within the head. The single phase detector and comparator for both coarse and fine frequencies reduces the number of components in the control, but the invention also contemplates the use of individual detectors and comparators for each of the respective frequencies. Compensation circuitry may be provided in the autofocus control to adjust the operation of the control for variations in wavelength caused by changes in ambient temperature, pressure and humidity. Accordingly, the present invention has been described in several embodiments by way of illustration rather than limitation.

We claim:

1. A multiple frequency ranging apparatus for measuring the distance between an object and a reference plane comprising:
   oscillator means for generating signals at first and second frequencies, the second frequency being higher than the first frequency;
   wave generating means connected with the oscillator means and associated with the objects and reference plane for producing energy waves characterized by the first and second frequencies and transmitting the waves between the object and the reference plane;
   wave receiving means associated with generating means for receiving the waves transmitted by the generating means between the object and the reference plane;
   detecting means having an input connected with the receiving means for detecting from the waves the distance between the object and the plane at the first frequency and the second frequency; and
   control means associated with the detecting means for switching the detection of the distance between the object and the plane from the first frequency for coarse detection to the second frequency for fine detection.

2. A multiple frequency ranging apparatus for measuring distance as defined in claim 1 wherein:
   the wave receiving means has two outputs corresponding with the energy waves at the first and second frequencies respectively; and
   the control means includes mode switching means at the input of the detecting means for transmitting signals individually to the detecting means from the respective outputs of the receiving means.

3. A multiple frequency ranging apparatus for measuring distance as defined in claim 1 wherein:
   the mode switching means includes a mode switch between the oscillator means and the wave generating means for controlling wave generation characteristics at the first and the second frequencies.

4. A multiple frequency ranging apparatus as defined in claim 3 wherein:
   the wave generating means includes modulator means connected with the oscillator means for modulating at the characteristic first frequency a carrier wave produced by the generating means at the second frequency; and
   the mode switch of the mode switching means is associated with the modulator means to control the modulation of the carrier wave.

5. A multiple frequency ranging apparatus as defined in claim 1 wherein:
   the detecting means has an output providing a signal indicative of the distance between the object and the reference plane; and
   the control means includes logic circuitry means connected with the detecting means for changing the detection of the distance from the energy wave at the first frequency to the energy wave at the second frequency in response to the signal from the output of the detecting means.

6. A multiple frequency ranging apparatus for measuring distance as defined in claim 1 wherein:
   the detecting means comprises a phase detector comparing the phase of the transmitted and the received waves at both the first frequency and at the second frequency.

7. A multiple frequency ranging apparatus for measuring distance as defined in claim 6 wherein:
   the phase detector and the wave generating means are both connected with the oscillator means to operate at the first and the second frequencies; and
   the control means includes mode switching means associated with the phase detector for changing the operating frequencies of the wave generating means and the phase detector simultaneously from the first to the second frequency.

8. A multiple frequency ranging apparatus for measuring distance as defined in claim 1 further including motor means connected with the detecting means for adjusting the distance between the object and the reference plane in response to the distance detected by the detecting means to maintain a predetermined distance.

9. A multiple frequency ranging apparatus for measuring the distance between an object and a reference plane as defined in claim 1 wherein the wave generating means and the wave receiving means are both mounted in stationary relationship with the object, and are directionally sensitive and oriented to transmit an energy wave toward the reference plane and receive the energy wave reflected from the reference plane.

10. In an optical apparatus having an optical mechanism with a lens system for focusing on a generally planar work surface and means for adjusting the focus of the optical mechanism on the work surface, an improved focus control comprising:
   transmitting means and receiving means for sending and receiving respectively an energy wave along a wave path between the optical mechanism and the work surface, the transmitting means producing discrete energy waves at more than one characteristic frequency, and the receiving means receiving the waves at the same characteristic frequencies;
   detecting means connected with the receiving means for establishing from the received energy wave a measure of the correspondence between the focus of the lens system in the optical mechanism and the work surface and connected with the adjusting means for adjustment of the focus on the work surface;
   and
   control means associated with the transmitting means and the detecting means for switching the operation of the transmitting means between discrete waves at different characteristic frequencies as a function of the correspondence between the focus and the work surface.

11. In an optical apparatus, the improved focus control of claim 10 wherein the control means includes means for switching the operation of the transmitting means from a lower characteristic frequency to a higher characteristic frequency as the focus and the work surface are brought into correspondence.

12. In an optical apparatus, the improved focus control of claim 10 wherein the transmitting means and the receiving means are mounted in stationary relationship with the optical mechanism and lie along a reflected wave path between the optical mechanism and the work surface.

13. In an optical apparatus, the improved focus control of claim 12 wherein the optical mechanism has an optical axis and a focal point on the optical axis, and the transmitting means and the receiving means are mounted in spaced relationship with each other and directed along a reflected wave path passing through the focal point on the optical axis.

14. In an optical apparatus, the improved focus control of claim 10 wherein the transmitting means includes an oscillator producing a plurality of signals at different characteristic frequencies and modulator means connected with the oscillator for producing an energy wave modulated by the oscillator at a selected characteristic frequency.

15. In an optical apparatus, the improved focus control of claim 10 wherein:
the detecting means comprises phase detecting means connected with the transmitting means and the receiving means for comparing the phase of the transmitted and received energy waves; and
the control means includes means for switching the operation of the transmitting means between different characteristic frequencies, and simultaneously switching the operation of the phase detector between different characteristic frequencies.

16. In an optical apparatus, the improved focus control of claim 10 wherein:
the control means includes supervising means having a signal level detector monitoring the signal level of the wave received by the receiving means for inhibiting adjustment of the focus on the work surface when the monitored signal level falls out of tolerance.

17. A photoplotter with autofocus control comprising:
support means for holding a photosensitive film with the film surface disposed for exposure;
an optical head for projecting images onto the photosensitive film for exposure and including a lens adjustable relative to the support means for focusing the projected images on the film surface;
controlled carriage means for moving the optical head and the photosensitive film on the support means relative to one another in directions generally parallel to the film surface for exposing the film;
motor means connected with the adjustable lens in the optical head for moving the lens and adjusting the focus of the images projected on the film surface; and
an autofocus control connected with the motor means to hold the projected images in focus as the optical head and film are moved relative to one another while exposing the film including:
wave generating and receiving means connected with the optical head for reflecting energy waves at a first and a second frequency between the optical head and the film surface,
detecting means connected with the wave generating and receiving means for determining the distance between the optical head and the film surface in response to the reflected energy waves at the first and second frequency, and
control means connected with the motor means moving the adjustable lens for adjusting the focus of the projected images in response to the distance determined by the detecting means, and also connected with the wave generating means for selectively controlling the generation of energy waves at the first and the second frequency.

18. A photoplotter with autofocus control as defined in claim 17 wherein:
the detecting means comprises a phase detector connected with the wave generating and receiving means for determining the distance between the optical head and the film surface from the difference in phase of the generated and received waves.

19. A photoplotter with autofocus control as defined in claim 18 wherein:
the phase detector is connected with the wave generating and receiving means to receive the waves at the first and the second frequencies respectively and measure the phase difference between the transmitted and received wave; and
the wave generating and receiving means generating waves at first and second frequencies producing the same phase difference at the desired focus.

20. A photoplotter with autofocus control as defined in claim 17 wherein:
the wave generating means includes a multi-frequency wave generator for generating discrete energy waves selectively at the first and the second frequency respectively, the first frequency being lower than the second frequency; and
the control means is connected to the wave generating means for switching the operation of the multi-frequency generator from the first frequency to the second frequency as the film surface is brought into focus.

21. A photoplotter as defined in claim 20 wherein the first and second frequencies are ultrasonic frequencies.

22. A photoplotter with autofocus control as defined in claim 17, wherein:
the wave generating and receiving means includes a wave transmitter having a transmitting axis along which a generated wave is emitted, and a receiver having a sensitive receiving axis along which an emitted wave is detected; and
the transmitter and receiver are mounted in spaced relationship on the optical head with the adjustable lens and with the transmitting axis and the receiving axis each disposed in a common plane at the same angle to the film surface and in intersecting relationship with each other in the vicinity of the film surface when the image projected from the lens is focused on the film surface whereby emitted waves from the transmitter are reflected from the film surface and received by the receiver along the sensitive axis.

23. A photoplotter with autofocus control as defined in claim 22 wherein the transmitter, receiver and adjustable lens in the optical head are collectively movable by the motor means toward and away from the film surface between a lower position in which the projected image is focused on the film surface and the receiver is in a position to receive emitted waves reflected from the film surface, and an elevated position in which the receiver is in a position above the emitted waves reflected from the film surface.

24. A photoplotter as defined in claim 22 wherein:
the optical head has an optical axis along which an image is projected onto the photosenstive surface of the film; and
the transmitter and the receiver are mounted on the optical head with the respective axes of the transmitter, the receiver and the optical head intersecting in the vicinity of the film surface when the image projected from the lens of the optical head is focused on the film surface.

25. A photoplotter with autofocus control as defined in claim 17 wherein the autofocus control further includes signal supervision means for decoupling the autofocus control from the motor means in the event that the signals from the transmitting and receiving means should fail.

* * * * *